US010519909B2

(12) United States Patent
Schaad et al.

(10) Patent No.: US 10,519,909 B2
(45) Date of Patent: Dec. 31, 2019

(54) VALVE FOR METERING A FLUID

(71) Applicant: Robert Bosch GmbH, Stuttgart (DE)

(72) Inventors: Andreas Schaad, Maulbronn (DE); Joerg Abel, Gerlingen (DE); Juergen Maier, Ottmarsheim (DE); Martin Buehner, Backnang (DE); Matthias Boee, Ludwigsburg (DE); Olaf Schoenrock, Stuttgart-Weilimdorf (DE); Philipp Rogler, Stuttgart (DE); Stefan Cerny, Bietigheim-Bissingen (DE)

(73) Assignee: Robert Bosch GmbH, Stuttgart (DE)

( * ) Notice: Subject to any disclaimer, the term of this patent is extended or adjusted under 35 U.S.C. 154(b) by 118 days.

(21) Appl. No.: 15/739,277

(22) PCT Filed: Jun. 23, 2016

(86) PCT No.: PCT/EP2016/064505
§ 371 (c)(1),
(2) Date: Dec. 22, 2017

(87) PCT Pub. No.: WO2016/207268
PCT Pub. Date: Dec. 29, 2016

(65) Prior Publication Data
US 2018/0180003 A1  Jun. 28, 2018

(30) Foreign Application Priority Data

Jun. 24, 2015  (DE) .................. 10 2015 211 667

(51) Int. Cl.
*F02M 51/06* (2006.01)
*F16K 31/06* (2006.01)

(52) U.S. Cl.
CPC ..... *F02M 51/0653* (2013.01); *F02M 2200/26* (2013.01); *F02M 2200/304* (2013.01);
(Continued)

(58) Field of Classification Search
CPC ............. F02M 51/0653; F02M 51/066; F02M 51/0685; F02M 2200/9053;
(Continued)

(56) References Cited

U.S. PATENT DOCUMENTS

2015/0041568 A1* 2/2015 Izzo .................. F02M 51/0685
239/585.5

FOREIGN PATENT DOCUMENTS

DE     19849210 A1    4/2000
DE     19950761 A1    4/2001
(Continued)

OTHER PUBLICATIONS

International Search Report dated Apr. 8, 2016 of the corresponding International Application PCT/EP2016/064505 filed Jun. 23, 2016.

*Primary Examiner* — Christopher S Kim
*Assistant Examiner* — Juan C Barrera
(74) *Attorney, Agent, or Firm* — Norton Rose Fulbright US LLP; Gerard Messina

(57) ABSTRACT

A fluid metering valve includes a valve-seat surface; a valve closing element that interacts with the valve-seat surface in order to form a sealing seat; an electromagnetic actuator; a valve needle used for operating the valve-closing element; an armature that is guided on the valve needle and is used for opening or closing the sealing seat; at least one stop that is disposed on, and stationary relative to, the valve needle and that restricts a movement of the armature on the valve needle; and at least one damping element that is configured to provide a damping during the opening or closing of the sealing seat, has a volume that is able to be filled with a fluid medium, is configured such that a fluid medium can be exchanged between the volume and an environment of the damping element, and is configured for volume changes of the volume in order to enable the damping.

11 Claims, 3 Drawing Sheets

(52) U.S. Cl.
CPC ............... *F02M 2200/308* (2013.01); *F02M 2200/9053* (2013.01); *F16K 31/0662* (2013.01); *F16K 31/0665* (2013.01)

(58) Field of Classification Search
CPC ....... F02M 2200/26; F02M 2200/9023; F02M 55/04; F02M 25/0818; F02M 25/0836; F02M 25/0809; F02M 37/0041; F02M 25/0854; F02M 2200/315; F02M 25/089; F02M 59/44; F02M 2220/9053; F02M 59/025; F02M 59/464; F02M 59/466; F02M 2025/0881; F02M 37/0047; F02M 37/0076; F02M 37/22; F02M 47/027; F02M 51/0614; F02M 55/02; F02M 55/025; F02M 59/027; F02M 59/102; F02M 59/442; F02M 59/46; F02M 59/462; F02M 63/0265; F02M 63/029; F02M 69/046; F02M 21/0245; F02M 2200/03; F02M 2200/8053; F02M 2200/8084; F02M 35/0218; F02M 35/1038; F02M 35/104; F02M 37/043; F02M 37/08; F02M 37/10; F02M 51/04; F02M 55/004; F02M 55/007; F02M 59/02; F02M 59/10; F02M 59/365; F02M 59/366; F02M 59/367; F02M 59/48; F02M 61/12; F02M 63/0019; F02M 63/0024; F02M 63/0075; F02M 63/0078; F02M 63/0225; F02M 63/0285; F02M 69/02; F02M 21/0218; F02M 21/0284; F02M 21/0287; F02M 2200/02; F02M 2200/08; F02M 2200/09; F02M 2200/20; F02M 2200/28; F02M 2200/302; F02M 2200/306; F02M 2200/308; F02M 2200/31; F02M 2200/50; F02M 2200/502; F02M 2200/856; F02M 2200/857; F02M 25/0827; F02M 25/0872; F02M 26/06; F02M 26/25; F02M 35/10019; F02M 35/10157; F02M 35/10386; F02M 35/10393; F02M 37/0017; F02M 37/0023; F02M 37/0052; F02M 37/0064; F02M 37/04; F02M 39/005; F02M 39/02; F02M 51/06; F02M 51/0642; F02M 51/0671; F02M 51/0675; F02M 51/0692; F02M 53/00; F02M 55/005; F02M 55/008; F02M 57/06; F02M 59/16; F02M 59/34; F02M 59/368; F02M 61/08; F02M 61/14; F02M 61/167; F02M 61/168; F02M 61/1806; F02M 61/20; F02M 63/0001; F02M 63/0017; F02M 63/0063; F02M 63/0077; F02M 63/026; F02M 65/003; F02M 69/462; F16K 31/0686; F16K 31/0662; F16K 31/0665

USPC .............. 239/584–585.5; 251/129.15–129.22

See application file for complete search history.

(56) References Cited

FOREIGN PATENT DOCUMENTS

| | | |
|---|---|---|
| DE | 102007056988 A1 | 5/2009 |
| DE | 102013222613 A1 | 5/2015 |
| DE | 102013225817 A1 | 6/2015 |
| EP | 2466109 A1 | 6/2012 |
| EP | 2597296 A1 | 5/2013 |
| EP | 2664779 A1 | 11/2013 |
| JP | 2005171845 A | 6/2005 |
| JP | 2006017101 A | 1/2006 |
| JP | 2009013917 A | 1/2009 |
| JP | 2014098373 A | 5/2014 |

\* cited by examiner

VALVE FOR METERING A FLUID

CROSS-REFERENCE TO RELATED APPLICATIONS

The present application is the national stage of International Pat. App. No. PCT/EP2016/064505 filed Jun. 23, 2016, and claims priority under 35 U.S.C. § 119 to DE 10 2015 211 667.0, filed in the Federal Republic of Germany on Jun. 24, 2015, the content of each of which are incorporated herein by reference in their entireties.

FIELD OF THE INVENTION

The present invention relates to a valve for metering a fluid, in particular a fuel-injection valve for internal combustion engines. More specifically, the present invention relates to the field of injectors for fuel-injection systems of motor vehicles in which a direct injection of fuel into combustion chambers of an internal combustion engine preferably takes place.

BACKGROUND

A fuel injector for fuel-injection systems of internal combustion engines is known from the document DE 199 50 761 A1. The known fuel injector includes a valve needle that interacts with a valve-seat surface to form a sealing seat. An armature engaging at the valve needle is movably guided on the valve needle and damped with the aid of an elastomer ring made from an elastomeric material. A planar support ring, which axially supports the elastomer ring in the region of an outlet of a fuel duct of the armature, is situated between the elastomer ring and the armature. A lateral cover of the elastomer ring may also be provided here, which allows for the use of an elastomer having high internal damping and therefore a relatively low modulus of elasticity.

SUMMARY

According to an example embodiment of the present invention, a valve is provided that has an advantage that it allows for an improved design and operating principle. More specifically, it is possible to realize a robust design in which the impact impulses related to a free path of the armature are able to be damped.

The armature serving as a solenoid armature is not fixedly connected to the valve needle in the valve for metering the fluid, but is supported in a flying manner between stops. In practice, such stops are able to be realized with the aid of stop sleeves and/or stop rings. In the rest state, the armature is then able to be moved against a stop that is stationary with respect to the valve needle using a restoring spring, so that the armature lies against the stop. During the actuation of the valve, the entire free path of the armature will then be available as an acceleration path. The free path of the armature can be understood as the axial play between the armature and the two stops.

In comparison with a fixed connection of the armature to the valve needle, the realization using an armature free path provides an advantage that the valve needle is able to be opened in a reliable manner at an identical magnetic force even at higher pressures, in particular higher fuel pressures, through the impulse of the armature that is being created during the opening. This can be referred to as a dynamic mechanical reinforcement. Another advantage is that the involved masses are decoupled, so that the resulting impact forces at the sealing seat are distributed to two impulses.

However, specific problems arise due to the flying-type support of the armature. During the closing of the valve, the armature can basically bounce back again after striking the respective stop. In the extreme case, the entire free path of the armature can be run through again after the bounce-back, so that the armature still has enough energy when subsequently striking the opposite stop that the valve needle will be briefly lifted off its seat once again and unintended post-injections take place, which cause an increase in consumption and higher pollutant emissions. But even if the entire armature free path is not run through, the armature can still require some time after bouncing back to come to rest and reach the starting position again. If a new actuation takes place prior to the final stabilization, which is particularly important in multi-injections featuring brief pause intervals between multiple injections, no robust valve function will be obtained. For example, it can occur that the impact pulses increase or decrease accordingly, which, in the worst-case scenario, can result in the valve no longer opening at all since the required impact impulse is no longer sufficiently strong to open the valve.

The throttle element advantageously allows for damping, which prevents or at least reduces armature bounce. In this way, a more robust multi-injection capability at brief pause intervals can be achieved. More specifically, the solenoid armature is able to reach its rest position (starting position) more rapidly again. In addition, lower impact impulses during the closing are achievable, which reduces the wear on the armature, the stops, and on the valve seat. This also causes fewer function changes over the service life of the valve. Moreover, a lower excitation of structure-borne noise is achievable, which reduces the noise.

The valve-closing element, which is operated by the valve needle, can be developed in one piece with the valve needle. The valve-closing element can be developed as a spherical valve-closing element or also in some other way. Depending on the application case and the design, the valve needle can be made up of one or multiple part(s). In particular, the damping element is able to be integrated into the valve needle.

It is also possible to use multiple damping elements which need not necessarily have an identical development in the design of the valve. Different function principles are also combinable with each other in order to influence the damping behavior. For example, it is also conceivable to integrate one damping element into the valve needle while another damping element damps the impact on one of the stops. In addition, in order to restrict the free path of the armature, for example, it is also possible to provide two stops that are stationary in relation to the valve needle and on which a damping element is provided in each case.

The valve is also suitable for metering gaseous fluids in order to inject them into a combustion chamber of an internal combustion engine, for instance. In particular in the case of a development such as this, a separate fluid medium can be provided, which is provided in the environment of the damping element. In a valve for metering a liquid fluid, this liquid fluid can preferably also be used as a fluid medium for the damping element.

According to an example embodiment of the present invention, the valve is designed such that the exchange of the fluid medium between the interior space and the environment of the damping element is advantageously adjustable via the development of the sleeve. Because of the development that includes the sleeve, it is additionally or alternatively also possible to hold a material possibly provided inside the sleeve in a spatially compact manner.

According to an example embodiment of the present invention, the valve is designed such that the sleeve itself is advantageously deformable when damping an impact, which results in a change in volume inside the sleeve. For example, when flattened or elongated, the damping element can have a smaller volume that is able to be filled with the fluid medium. Advantageous damping then results from the volume exchange.

According to an example embodiment of the present invention, the valve is designed such that it advantageously allows for a development that is more robust with respect to media such as fuel. In addition, a behavior that is constant across the service life is achievable. If necessary, the metallic mesh can also be elastic, so that a starting state of the sleeve of the damping element that is assumed in the unloaded state is able to be predefined. An additional contribution to the damping can also be achieved via the elasticity of the metallic mesh, as the case may be.

According to an example embodiment of the present invention, the valve is designed such that the damping specified via the fluid exchange is advantageously able to be amplified via the elastically deformable metal wire mesh. This also provides the possibility of a further adjustment of the damping. In addition, a starting geometry in the unloaded state is able to be specified via the elastically deformable metal wire mesh. For instance, after the damping element has been compressed, the starting state can thus be brought about again following the loading.

According to an example embodiment of the present invention, the valve is designed such that a large fluid exchange is advantageously possible during the compression of the damping element. This results in an optimal hydraulic damping behavior.

According to an example embodiment of the present invention, the valve is designed such that high stiffness of the metal foam is advantageously achievable, which increases the damping that is made possible via the fluid exchange. In addition, a development in one piece can be realized, as the case may be.

According to an example embodiment of the present invention, the valve is designed for advantageously avoiding direct contact between the armature and the stop. This also makes it possible to achieve a substantial displacement of the fluid medium provided within the volume of the damping element.

According to an example embodiment of the present invention, the valve is designed such that the lifting range of the damping element is advantageously restricted given a corresponding placement of the damping element, which allows for an adjustment of the damping. In particular, bouncing of the armature on the respective stop can follow the damping travel when an actuation of the actuator takes place.

Thus, it is possible to damp either the entire impulse of the actuator or to realize part of the impulse with the aid of a fixed stop.

According to an example embodiment of the present invention, the valve is designed such that the armature can advantageously be allowed to directly strike the fixed stop as the case may be because the damping is achieved via the damping element that is integrated into the valve needle.

Preferred exemplary embodiments of the present invention are described in greater detail in the following description with reference to the attached figures in which corresponding elements have been provided with matching reference numerals.

DETAILED DESCRIPTION

Figure 1:
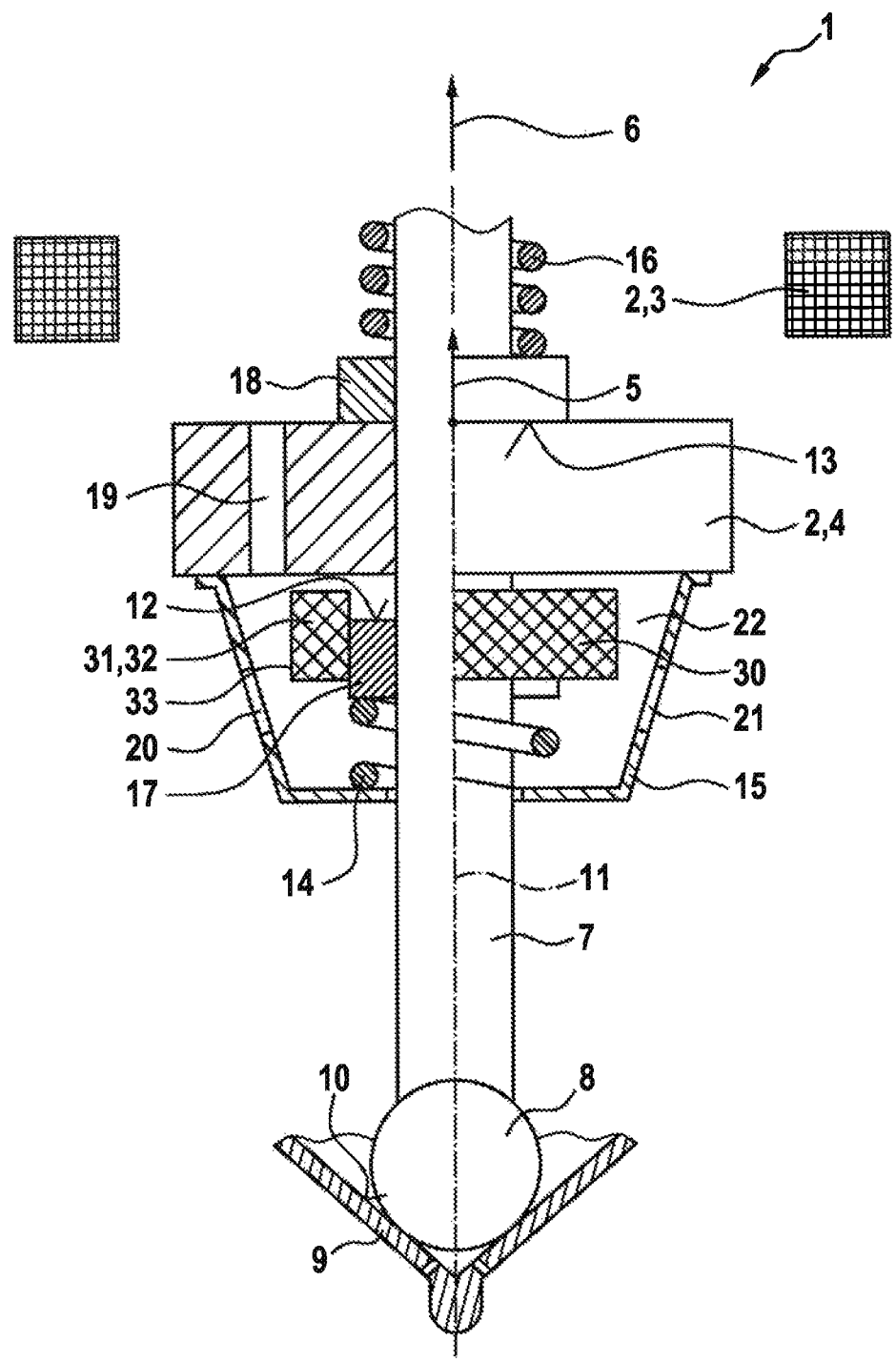
FIG. 1 illustrates a valve in a partial schematized sectional view according to a first exemplary embodiment of the present invention.

FIG. 1 shows a valve 1 for metering a fluid in a partial schematized sectional view according to a first exemplary embodiment. Valve 1 can be developed as a fuel injector 1, in particular. A preferred application case is a fuel-injection system, in which case such fuel injectors 1 are developed as high-pressure injectors 1 and are used for the direct injection of fuel into allocated combustion chambers of the internal combustion engine. Liquid or gaseous fuels can be used as fuel in this context.

Valve 1 has an electromagnetic actuator 2, which includes a solenoid coil 3, an armature 4, and further elements that are not shown, such as a pole body. A magnetic circuit is closed through the energization of solenoid coil 3, so that a magnetic attractive force 5 acts on armature 4 and thereby operates armature 4 in an opening direction 6.

Valve 1 has a valve needle 7, which is used for operating a valve-closing element 8. Valve-closing element 8 interacts with a valve-seat surface 10 developed on a valve-seat body 9 to form a sealing seat. In order to open this sealing seat, valve needle 7 is adjusted in opening direction 6. The adjustment of valve needle 7 takes place along a longitudinal axis 11.

Armature 4 of actuator 2 is movably disposed on valve needle 7. Mobility along longitudinal axis 11 is possible between stops 12, 13, which are stationary with respect to valve needle 7. Armature 4 is retained in a starting position via a spring 14 and an armature basket 15, which is connected to armature 4 when no actuation takes place. For the opening of valve 1, armature 4 is accelerated in opening direction 6 through magnetic pickup force 5 until armature 4 strikes stop 13. This causes the actuation of valve needle 7, which in turn operates valve-closing element 8.

A valve spring 16, which acts upon valve-closing element 8 via valve needle 7 in the direction of valve-seat surface 10, is used for closing valve 1. When the energization of solenoid coil 3 is ended, armature 4 is adjusted counter to opening direction 6 due to spring 14 and valve spring 16. During the closing, armature 4 is moved against stop 12.

In this exemplary embodiment, stops 12, 13 are developed on stop rings 17, 18, which are connected to valve needle 7. In addition, armature 4 has through bores 19, which allow the passage of fuel in the axial direction. Accordingly, through openings 20, 21, via which the fuel is conveyed to the sealing seat, are developed on armature basket 15. In one modified example embodiment, however, it is also possible to provide a suitable pressurized fluid as a fluid medium in a space 22 inside armature basket 15, which differs from the fuel to be injected.

Valve 1 has at least one damping element 30. In this exemplary embodiment, only one damping element 30 is provided. This damping element 30 in this exemplary embodiment is used for damping the movement of armature 4 before it strikes stop 12, which takes place counter to opening direction 6. In one modified example embodiment, a damping element that is developed according to damping element 30 can additionally or alternatively be used also for damping the impact on stop 13. Furthermore, modified developments of damping element 30 as they are described on the basis of FIGS. 2 and 3, among others, are also possible.

Fluid medium, which plays a role in the damping function, fills at least an environment 22 of damping element 30, which is provided by space 22 within armature basket 15 in this exemplary embodiment. To enable the damping, damping element 30 is developed in such a way that it allows for an exchange of the fluid medium between a volume 31 of damping element 30, which is able to be filled with the fluid medium, and environment 22. Here, an interior space 32 of damping element 30 can be at least essentially empty and thus form volume 31. Damping element 30 has a permeable sleeve 33, via which an exchange between volume 31, which is provided in interior space 32 of damping element 30 and is able to be filled with the fluid medium, and environment 22 is possible. In this exemplary embodiment, sleeve 33 is furthermore developed as a deformable sleeve 33.

In this particular exemplary embodiment, damping element 30 is in annular form. More specifically, damping element 30 is developed in hollow-cylindrical form. A deformation of damping element 30 along longitudinal axis 11 is possible, for which purpose, sleeve 33 of damping element 30 can be developed from a metallic mesh 33, for instance. In one modified example embodiment, sleeve 33 can also be developed in the form of a perforated metallic wall 33.

In this exemplary embodiment, damping element 30 is situated parallel to stop 12. In response to a movement against stop 12, which takes place counter to opening direction 6, armature 4 initially interacts with damping element 30 and then, when the now already damped movement impulse is still of sufficient strength, it interacts with stop 12. In this exemplary embodiment, the parallel placement of damping element 30 and stop 12 is realized in that annular damping element 30 encloses stop area 12 of stop ring 17, which forms stop 12, in relation to longitudinal axis 11, so that armature 4 is able to come into direct contact with stop 12 given a movement impulse of sufficient magnitude.

However, depending on the development of valve 1, in particular of actuator 2, it is also conceivable that within the framework of the actuations that take place during the operation, the movement impulse of armature 4 counter to opening direction 6 is always smaller, due to the design, than would be required for striking stop 12. Depending on the configuration of the valve, it is therefore also conceivable that the starting position of armature 4, which corresponds to a closed valve 1, is not synonymous with armature 4 resting against stop 12.

Figure 2:
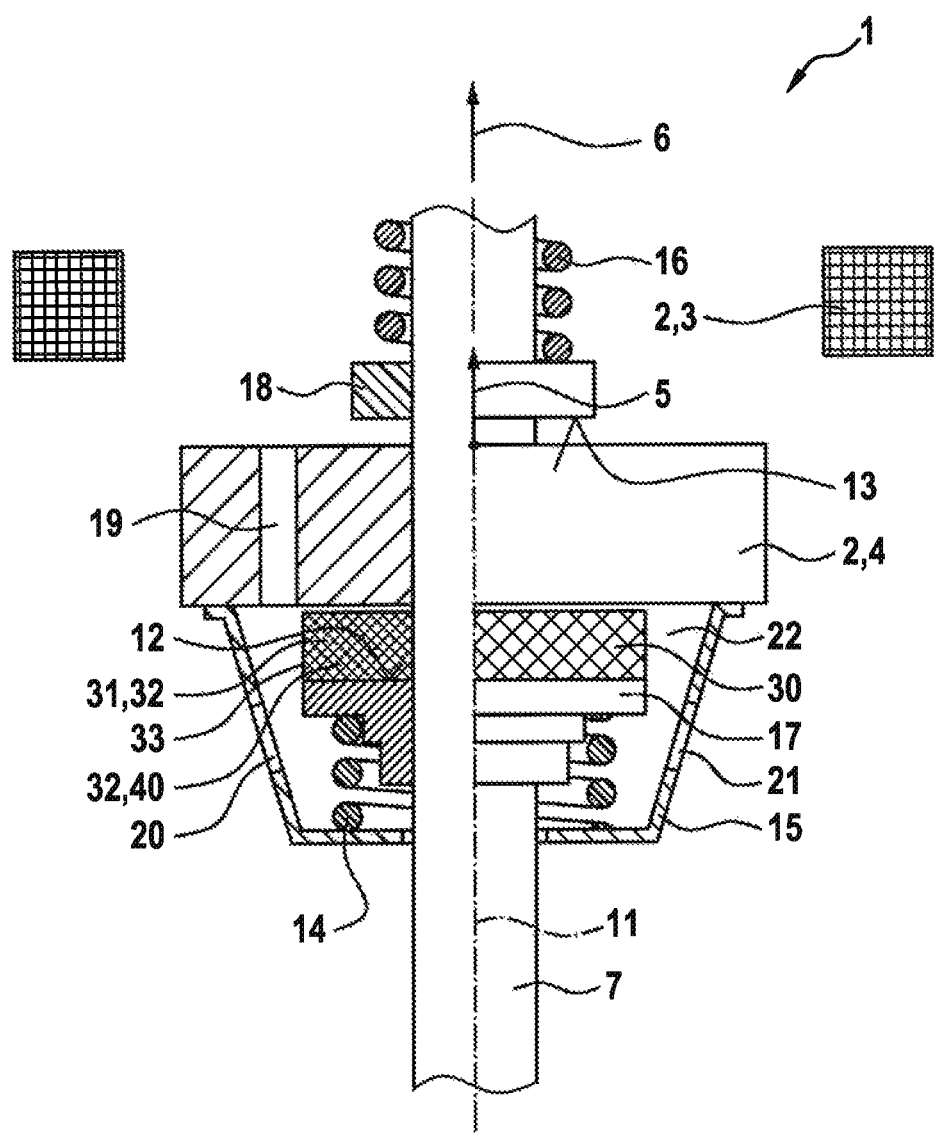
FIG. 2 illustrates a valve in a partial schematized sectional view according to a second exemplary embodiment of the present invention.

FIG. 2 shows a valve 1 in a partial schematized sectional view according to a second exemplary embodiment. In this particular exemplary embodiment, damping element 30 is disposed between stop 12 and armature 4. This makes it impossible for armature 4 to strike stop 12 directly. When armature 4 is traveling toward stop 12 at an impulse counter to opening direction 6, then complete damping of the movement impulse preferably takes place in this exemplary embodiment. Damping element 30 has an elastically deformable metal wire mesh 40 in this particular exemplary embodiment, which is situated in interior space 32. The remaining portion of interior space 32 forms volume 31 that can be filled with the fluid medium. On the one hand, damping takes place via the fluid medium, which is displaced from volume 31 when damping element 30 is compressed, and metal wire mesh 40 itself is able to contribute to the damping on the other hand. Metal wire mesh 40 is developed as an elastically deformable metal wire mesh 40 in this case, which opposes the movement of armature 4 counter to opening direction 6. Because of this, an axial expansion of damping element 30, which can be described as a metal wire mesh 40 that spreads open on its own or which can be described as a sleeve 33 that unfolds as a result, also takes place during the movement of armature 4 in opening direction 6.

In one modified example embodiment, damping element 30 can also be formed from an open-pore metal foam 40, which is surrounded by a sleeve 33 or which can form damping element 30 even without such a sleeve 33. Such a modified development can also be used in the parallel placement described on the basis of FIG. 1.

Figure 3:
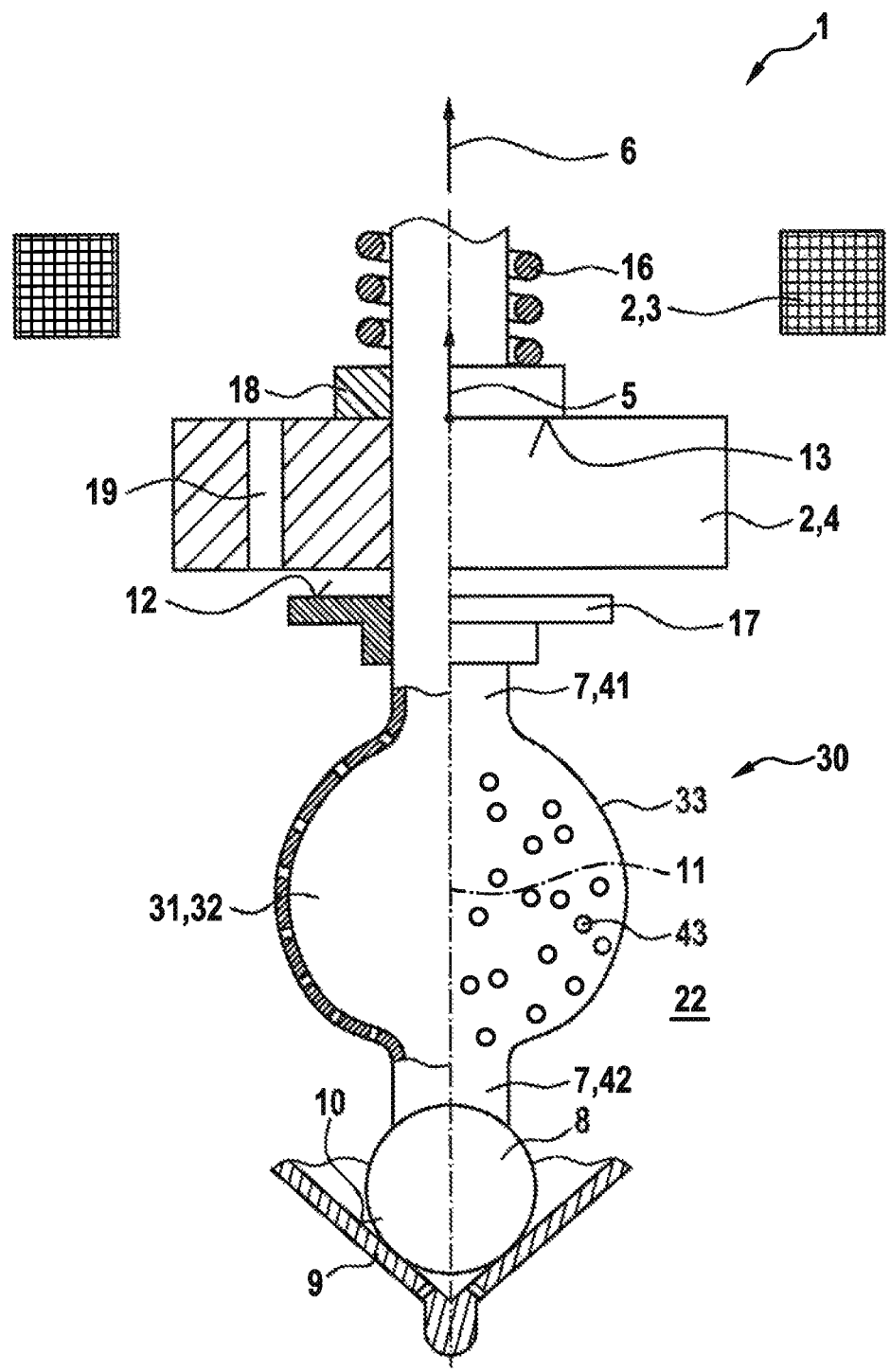
FIG. 3 illustrates a valve in a partial schematized sectional view according to a third exemplary embodiment of the present invention.

FIG. 3 shows a valve 1 in a partial schematized sectional view according to a third exemplary embodiment. In this particular exemplary embodiment, valve needle 7 includes a part 41 on the side of the armature and a part 42 on the side of the valve-closing element. Damping element 30 is inserted in valve needle 7 between parts 41, 42 in this exemplary embodiment. Damping element 30 has sleeve 33 in the form of a perforated, elastic balloon 33. In this exemplary embodiment, an interior space 32 is specified within this balloon-shaped sleeve 33, which is fully available as volume 31 able to be filled with the fluid medium. This allows for an exchange between environment 22 of sleeve 33 and interior space 32 via holes 43 or other openings 43, of which only hole 43 is marked in FIG. 3 in order to simplify the illustration. In one modified development, elastic sleeve 33, which is perforated on its lateral area, can also have a different shape. In addition, interior space 32 can possibly be partially filled with a metal wire mesh 40 or the like.

As a result, one or more damping element(s) 30 is/are able to function in the way of a bumper in order to dampen the impact impulse of armature 4 on at least one stop 12, 13, in particular during a closing operation. Through the type and development of damping element 30, the stiffness and damping characteristics are able to be optimally adapted to the closing impulse of armature 4 that arise in the individual application case. Here, it is possible to dampen the entire impulse of armature 4 or else only a part of this impulse. This makes it possible to improve the method of functioning of valve 1. In particular, a more robust multi-injection capability at short pause intervals is able to be realized.

The present invention is not restricted to the described exemplary embodiments and modifications.

What is claimed is:
1. A valve for metering a fluid, the valve comprising:
a valve-seat surface;
a valve closing element that interacts with the valve-seat surface in order to form a sealing seat;
an electromagnetic actuator;
a valve needle used for operating the valve-closing element;
an armature that is guided on the valve needle and is used for opening or closing the sealing seat;
at least one stop that:

is disposed on, and stationary relative to, the valve needle; and restricts a movement of the armature on the valve needle; and at least one damping element that:

is configured to provide a damping during the opening or closing of the sealing seat;

has a volume that is able to be filled with a fluid medium;

is configured such that a fluid medium can be exchanged between the volume and an environment of the damping element; and is configured for volume changes of the volume in order to enable the damping, wherein the damping element has a permeable sleeve.

2. The valve of claim 1, wherein the damping element is formed by an open-pore metal foam.

3. The valve of claim 1, wherein the damping element is situated between the stop and the armature.

4. The valve of claim 1, wherein the damping element is situated parallel to the stop, and is arranged such that, in response to a movement against the stop, the armature initially interacts with the damping element.

5. The valve of claim 1, wherein the damping element is positioned within the valve needle between the stop and the valve-closing element.

6. The valve of claim 1, wherein the valve is a fuel-injection valve for internal combustion engines.

7. A valve for metering a fluid, the valve comprising:

a valve-seat surface;

a valve closing element that interacts with the valve-seat surface in order to form a sealing seat;

an electromagnetic actuator;

a valve needle used for operating the valve-closing element;

an armature that is guided on the valve needle and is used for opening or closing the sealing seat;

at least one stop that:

is disposed on, and stationary relative to, the valve needle; and restricts a movement of the armature on the valve needle; and at least one damping element that:

is configured to provide a damping during the opening or closing of the sealing seat;

has a volume that is able to be filled with a fluid medium;

is configured such that a fluid medium can be exchanged between the volume and an environment of the damping element; and is configured for volume changes of the volume in order to enable the damping, wherein the damping element has a permeable sleeve that is fillable with the fluid medium, the fluid medium exchange being between an interior space of the sleeve and the environment of the damping element.

8. The valve of claim 7, wherein the sleeve of the damping element is a deformable sleeve.

9. The valve of claim 7, wherein the sleeve of the damping element is a metallic mesh or a perforated metallic wall.

10. The valve of claim 7, wherein the interior space provided within the sleeve is partially filled with an elastically deformable metal wire mesh.

11. The valve of claim 7, wherein the interior space provided within the sleeve is able to be completely filled with the fluid medium.

* * * * *